(12) United States Patent
Figgins

(10) Patent No.: US 11,419,270 B2
(45) Date of Patent: Aug. 23, 2022

(54) HEADER FOR AN AGRICULTURAL HARVESTER HAVING A DRAPER SEAL

(71) Applicant: CNH Industrial America LLC, New Holland, PA (US)

(72) Inventor: Ryan M. Figgins, New Holland, PA (US)

(73) Assignee: CNH Industrial America LLC, New Holland, PA (US)

(*) Notice: Subject to any disclaimer, the term of this patent is extended or adjusted under 35 U.S.C. 154(b) by 191 days.

(21) Appl. No.: 16/697,537

(22) Filed: Nov. 27, 2019

(65) Prior Publication Data

US 2020/0163280 A1 May 28, 2020

Related U.S. Application Data

(60) Provisional application No. 62/771,729, filed on Nov. 27, 2018.

(51) Int. Cl.
*A01D 61/02* (2006.01)
*A01D 34/14* (2006.01)
*A01D 34/18* (2006.01)
*A01D 34/04* (2006.01)
*A01D 61/00* (2006.01)
*A01D 57/20* (2006.01)

(52) U.S. Cl.
CPC ............. *A01D 61/02* (2013.01); *A01D 34/14* (2013.01); *A01D 34/04* (2013.01); *A01D 34/18* (2013.01); *A01D 57/20* (2013.01); *A01D 61/002* (2013.01)

(58) Field of Classification Search
CPC ........ A01D 61/02; A01D 34/14; A01D 34/18; A01D 34/04; A01D 61/002; A01D 57/20; A01D 41/14
See application file for complete search history.

(56) References Cited

U.S. PATENT DOCUMENTS 1,862,101 A * 6/1932 Pax ..................... A01D 61/002
198/523
1,881,411 A 10/1932 Love et al.
(Continued)

FOREIGN PATENT DOCUMENTS

EP 3434095 A1 1/2019

OTHER PUBLICATIONS

Extended European Search Report for EP Application No. 19211860.2 dated May 4, 2020 (six pages).

*Primary Examiner* — Arpad Fabian-Kovacs
(74) *Attorney, Agent, or Firm* — Peter Zacharias; Patrick Sheldrake

(57) ABSTRACT

A header for an agricultural harvester including a draper frame. A conveyor having a fore end and an aft end is supported by the draper frame and a draper seal is adjustably attached to the draper frame adjacent the fore end of the conveyor. The draper seal covers a bead seal at the fore end of the conveyor and extends substantially along the width of the fore end of the conveyor. The draper seal includes a first portion attached to the draper frame, a second portion extending forwardly from the first portion, a third portion extending upwardly from the second portion, and a fourth portion extending rearwardly from the third portion. The second, third and fourth portions surround and cover the conveyor bead seal.

20 Claims, 2 Drawing Sheets

(56) References Cited

U.S. PATENT DOCUMENTS

| | | | | |
|---|---|---|---|---|
| 1,917,604 A * | 7/1933 | Scranton, Jr. | ............ | A01D 34/13 |
| | | | | 56/298 |
| 2,347,365 A | 4/1944 | Paradise | | |
| 5,459,986 A | 10/1995 | Talbot et al. | | |
| 6,351,931 B1 | 3/2002 | Shearer | | |
| 7,478,521 B2 * | 1/2009 | Coers | ............... | A01D 61/002 |
| | | | | 56/208 |
| 7,549,280 B2 * | 6/2009 | Lovett | ............... | A01D 57/20 |
| | | | | 56/208 |
| 7,908,836 B1 | 3/2011 | Rayfield et al. | | |
| 7,958,711 B1 | 6/2011 | Sauerwein | | |
| 7,971,418 B2 * | 7/2011 | Conrad | ............... | A01D 41/148 |
| | | | | 56/181 |
| 8,484,939 B1 * | 7/2013 | Cormier | ............... | A01D 43/06 |
| | | | | 56/181 |
| 8,752,359 B2 | 6/2014 | Cormier et al. | | |
| 9,161,492 B2 * | 10/2015 | Fuechtling | ............ | A01D 41/14 |
| 9,271,443 B2 * | 3/2016 | Sethi | ............... | A01D 41/14 |
| 9,591,802 B2 * | 3/2017 | Allochis | ............... | A01D 34/14 |
| 9,814,183 B2 * | 11/2017 | Allochis | ............... | A01D 41/14 |
| 10,285,331 B2 * | 5/2019 | Leys | ............... | A01D 34/04 |
| 2007/0193243 A1 * | 8/2007 | Schmidt | ............... | A01D 57/20 |
| | | | | 56/181 |
| 2007/0204584 A1 * | 9/2007 | Coers | ............... | A01D 41/14 |
| | | | | 56/15.8 |
| 2007/0204589 A1 * | 9/2007 | Coers | ............... | A01D 57/20 |
| | | | | 56/208 |
| 2009/0007533 A1 * | 1/2009 | Lovett | ............... | A01D 61/002 |
| | | | | 56/14.5 |
| 2011/0005184 A1 | 1/2011 | Conrad et al. | | |
| 2014/0196427 A1 * | 7/2014 | Fuechtling | ............ | A01D 61/002 |
| | | | | 56/181 |
| 2019/0373815 A1 * | 12/2019 | Modak | ............... | A01D 34/40 |
| 2020/0015418 A1 * | 1/2020 | Talbot | ............... | A01D 34/14 |

\* cited by examiner

HEADER FOR AN AGRICULTURAL HARVESTER HAVING A DRAPER SEAL

FIELD OF THE INVENTION

The present disclosure relates in general to an agricultural harvester and in particular to a draper seal for a header of an agricultural harvester.

BACKGROUND OF THE INVENTION

Agricultural harvesters, e.g., plant cutting machines, including, but not limited to, combines, generally include headers operable for severing and collecting plant or crop material as the harvester is driven over a crop field. Such headers have a frame or chassis that supports plant cutting mechanisms for severing the plants or crop, such as a cutter bar mechanism, that reciprocates sidewardly relative to a non-reciprocating guard structure. Such headers typically further include one or more draper belts for feeding the cut plants or crop towards a feederhouse located centrally of the header.

The header frame has a fore end and an aft end. The fore end of the header frame carries a cutter bar assembly which includes an upper cutter bar plate and the aforementioned cutter bar mechanism. The rear or aft end the upper cutter bar plate extends over a fore end of the draper belt(s) to cover a bead seal or similar protuberance formed along the length of the fore end of the draper belt(s). A disadvantage of such a construction is that header frames are rarely, if ever, truly straight along their widths. Consequently, gaps exist between the upper cutter bar plate and the draper belt bead seal through which cut crop may pass and go unharvested by the agricultural harvester.

Accordingly, a need still exists for a draper seal that effectively seals the header such that crop material is not lost between the gaps within the header.

SUMMARY OF THE INVENTION

In accordance with the subject disclosure, there is provided a header for an agricultural harvester having a cutter bar plate and a draper frame adjacent the cutter bar plate. A conveyor is supported by the draper frame and has a fore end and an aft end, and a draper seal is attached to the draper frame adjacent the fore end of the conveyor.

According to an aspect, the draper seal comprises a first portion attached to the draper frame, a second portion extending forwardly from the first portion, a third portion extending upwardly from the second portion, and a fourth portion extending rearwardly from the third portion.

Further in accordance with the subject disclosure, there is provided an agricultural harvester having a header that comprises a cutter bar plate and a draper frame adjacent the cutter bar plate. A conveyor is supported by the draper frame and has a fore end and an aft end, and a draper seal is attached to the draper frame adjacent the fore end of the conveyor.

Draper conveyors typically have a seal at the fore end of the conveyor to prevent loose seeds, grain or other crop material from falling from the fore end of the conveyor and becoming lost. Current draper seal designs have a lip molded into the draper belt and a second stationary sealing surface mounted to the header frame. A problem with existing designs resides in providing a consistent seal along the length of the draper deck because large header frames are never straight. That is, the variance in the header frame usually causes a gap of varying distance to exist between the seal on the draper belt and the seal on the header frame. The present disclosure overcomes the problems of existing designs by mounting the second seal to the draper frame that carries the draper belt. In this way, a consistent clearance exists between the draper belt seal and the second seal along the full length of the draper deck. Such a construction eliminates clearance or gap issues related to the header frame not being straight. And, in the case of end delivery draper headers, the draper decks can be shifted left or right and the draper seal will not change. In addition, the draper seal according to the subject disclosure is vertically adjustable to account for variances in manufacturing, although the amount of vertical adjustment required is greatly reduced versus existing designs. A further advantage of mounting the second seal to the draper deck is that the draper seal geometry does not vary depending on the position of the draper belt along the header.

Other features and advantages of the subject disclosure will be apparent from the following detailed description, taken in conjunction with the accompanying drawings, which illustrate, by way of example, the principles of the subject disclosure.

BRIEF DESCRIPTION OF THE DRAWINGS

The foregoing exemplary embodiments, as well as the following detailed description of the subject disclosure, will be better understood when considered in view of the appended drawings. For the purposes of illustrating the invention, there are shown in the drawings exemplary embodiments. It should be understood, however, that the present disclosure is not limited to the precise arrangements and instrumentalities shown.

In the drawings.

DETAILED DESCRIPTION OF THE DRAWINGS

Reference will now be made in detail to the various aspects of the subject disclosure illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the subject disclosure in any manner not explicitly set forth. Additionally, the term "a," as used in the specification, means "at least one." The terminology includes the words above specifically mentioned, derivatives thereof, and words of similar import.

The term "about," as used herein when referring to a measurable value, such as an amount, a temporal duration, and the like, is meant to encompass variations of ±20%, ±10%, ±5%, ±1%, or ±0.1% from the specified value, as such variations are appropriate.

The term "substantially," as used herein, shall mean considerable in extent, largely, but not wholly, that which is specified, or an appropriate variation therefrom as is acceptable within the field of art.

Throughout this disclosure, various aspects of the present invention can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range, such as from 1 to 6, should be considered to have specifically disclosed subranges, such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages, and characteristics of the subject disclosure may be combined in any suitable manner in one or more embodiments. One skilled in the relevant art will recognize, in light of the description herein, that the present invention can be practiced without one or more of the specific features or advantages of a particular embodiment. In other instances, additional features and advantages may be recognized in certain embodiments that may not be present in all embodiments of the subject disclosure.

Figure 1:
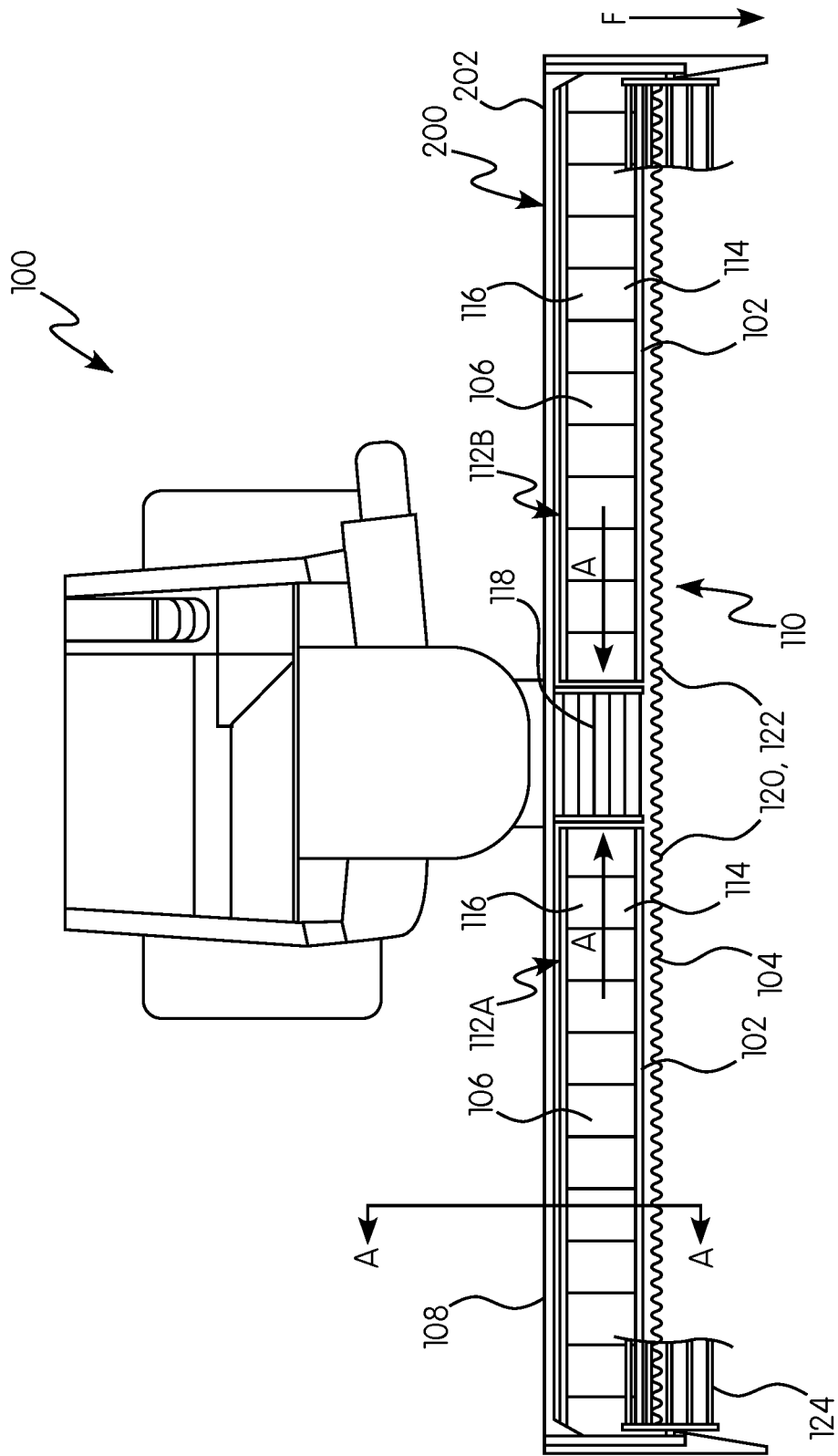
FIG. 1 is top plan view of an agricultural harvester including a header equipped with a draper seal in accordance with the subject disclosure.

Referring to FIG. 1, a representative agricultural harvester 100, which, e.g., may be a combine harvester, is shown. The harvester includes a draper header 200 incorporating a cut crop barrier interface 102 between an elongate sidewardly extending cutter bar 104 and a front edge of an elongate sidewardly extending draper conveyor 106 of the header 200.

The header 200 comprises a frame 202, a portion of which is shown extending forwardly from a rear support frame structure 108 to the cutter bar 104. The frame 202 can have a variety of forms, but will generally comprise a chassis-like structure for supporting an elongate sidewardly extending cutter bar assembly 110 comprising the cutter bar 104, as well as at least one elongate sidewardly extending draper assembly 112 comprising the draper conveyor 106, and other aspects of the header. The draper conveyors 106 each have a fore end 114 and an aft end 116.

As illustrated, the header 200 includes two draper assemblies 112A, 112B operable for conveying cut crop convergingly to a central conveyor 118, as generally denoted by arrows A, as the harvester moves in a forward direction denoted by arrow F through a field while cutting the crops. The central conveyor 118, in turn, conveys the cut crop into a feederhouse of the harvester 100, which conveys the crop into the harvester for threshing and separation of crop therefrom.

The cutter bar assembly 110 generally includes a sideward, longitudinally extending knife guard 120 having a plurality of forward projecting fingers 122. The cutter bar assembly 110 carries an elongate sickle comprised of knife sections which are sidewardly reciprocated through and relative to fingers 122 for cutting crop as the harvester moves in forward direction F. A reel 124 extends across the header just above cutter bar assembly 110, and operates to feed the crop to the cutter bar for cutting.

Figure 2:
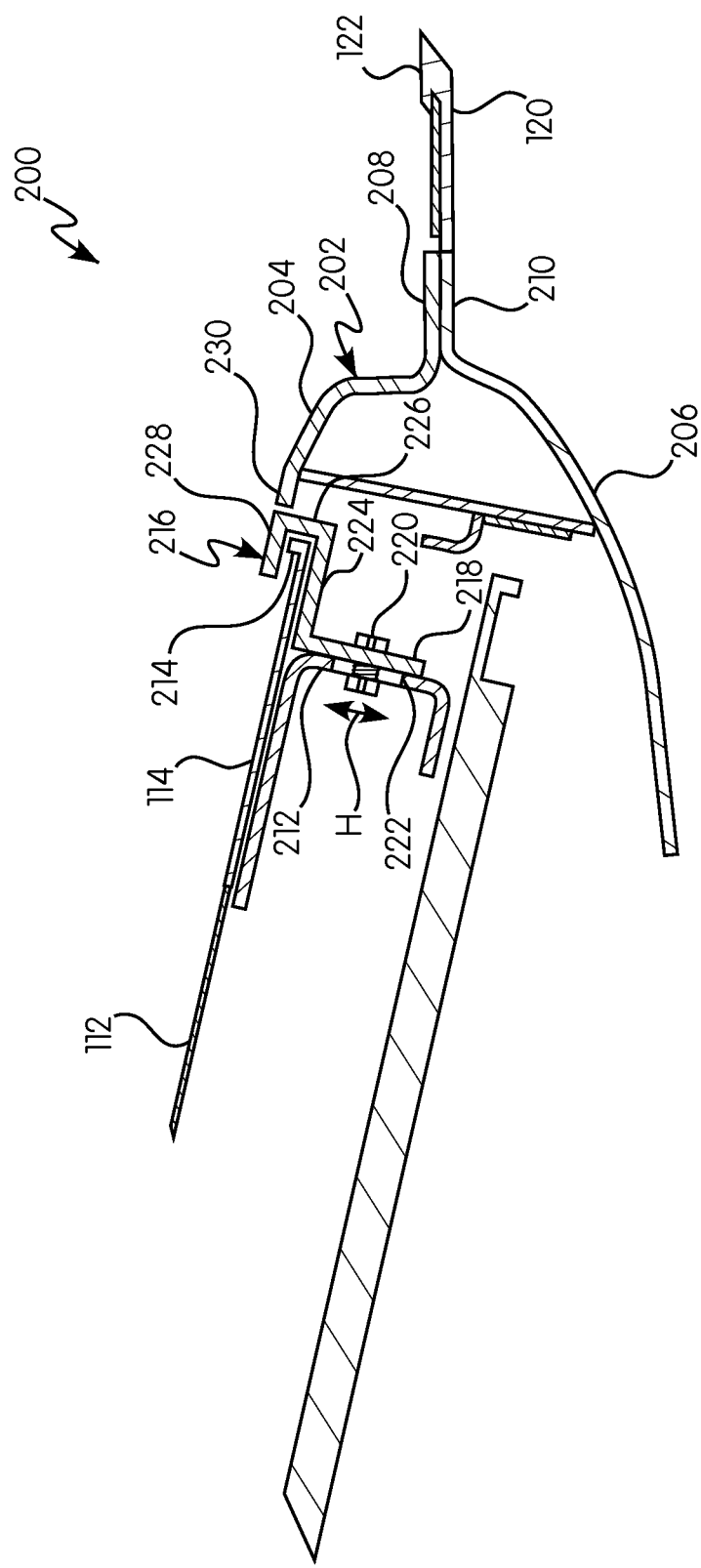
FIG. 2 is a transverse cross-sectional view of taken along line A-A of FIG. 1 of a header equipped with a draper seal in accordance with the subject disclosure.

Referring to FIG. 2, there is shown a partial transverse cross-sectional view of the fore end of the header 200 taken along line A-A of FIG. 1. The header 200 includes a header frame 202, an upper cutter bar plate 204 and a lower cutter bar plate 206 which at their fore ends 208, 210 are joined together with the cutter bar assembly. Also shown is a draper frame 212 disposed adjacent the upper cutter bar plate 204. The draper frame 212 is connected to header frame 202 and supports a draper conveyor 112 having a fore end 114 and an aft end 116 (FIG. 1). Disposed substantially along a fore end 114 of the draper conveyor 112 is a bead seal 214.

A draper seal 216 is attached to the draper frame 212 adjacent the fore end 114 of the conveyor 112 and covers the fore end of the conveyor. The draper seal 216 extends substantially along an entire width of the fore end of the conveyor.

According to an exemplary embodiment, the draper seal 216 is only attached to the draper frame and comprises a first portion 218 attached only to the draper frame 212 by a nut and bolt assembly or similar adjustable fastener 220 which passes through an unillustrated hole in the first portion and a substantially vertical slot 222 provided in the draper frame 212. The draper seal 216 further comprises a second portion 224 extending forwardly from the first portion 218, a third portion 226 extending upwardly from the second portion 224, and a fourth portion 228 extending rearwardly from the third portion 226. According to an embodiment, the second portion 224 extends perpendicular to substantially perpendicular to the first portion 218, the third portion 226 extends perpendicular to substantially perpendicular to the second portion 224, and the fourth portion 228 extends perpendicular to substantially perpendicular to the third portion 226. As used herein, "substantially perpendicular" shall mean a deviation from true perpendicularity not to exceed about plus or minus 10 degrees.

The draper seal 216 covers the bead seal 214. More particularly, the second, third and fourth portions 224, 226 and 228 closely surround the bead seal 214. The draper seal 216 is positioned between the conveyor 112 and the upper cutter bar plate 204 and is adjacent an aft end 230 of and is posterior to the upper cutter bar plate.

In the construction shown in FIG. 2, the distance between the fourth portion 228 of the draper seal 216 is vertically adjustable via adjustable fastener 220 that is moveable upwardly and downwardly in slot 222 in the direction of double-headed arrow H. With such adjustability, the fourth portion 228 of the draper seal 216 can be moved close to the bead seal 214 to minimize the size of gaps or spaces between the bead seal and the fourth portion (but not so close as to cause excessive contact friction between the bead seal and the fourth portion). Accordingly, less cut crop passes between the fourth portion 228 and the bead seal 214. As a result of the construction shown in FIG. 2, more cut crop is delivered to the harvester, thereby resulting in higher crop yield.

While the subject disclosure has been described with reference to certain embodiments, it will be appreciated by those skilled in the art that various changes may be made and equivalents may be substituted for elements thereof without departing from the scope of the subject disclosure. In addition, modifications may be made to adapt a particular situation or material to the teachings of the subject disclosure without departing from the essential scope thereof.

It is to be understood, therefore, that the subject disclosure not be limited to the particular aspects disclosed, but it is intended to cover modifications within the spirit and scope of the subject disclosure as discussed above.

I claim:

1. A header for an agricultural harvester comprising:
   a cutter bar plate;
   a draper frame adjacent the cutter bar plate and having a slot;
   a conveyor supported by the draper frame and having a fore end and an aft end;
   an adjustable draper seal including a first portion attached to the draper frame; and
   a fastener passing through the first portion and the slot for providing adjustments of the adjustable draper seal relative to the conveyor.

2. The header of claim 1, wherein the adjustable draper seal covers the fore end of the conveyor.

3. The header of claim 1, wherein the adjustable draper seal comprises:
   a second portion extending forwardly from the first portion;
   a third portion extending upwardly from the second portion; and
   a fourth portion extending rearwardly from the third portion.

4. The header of claim 1, wherein the adjustable draper seal comprises:
   a second portion extending perpendicular to the first portion;
   a third portion extending perpendicular to the second portion; and
   a fourth portion extending perpendicular to the third portion.

5. The header of claim 1, wherein the conveyor comprises a bead seal disposed along the fore end of the conveyor.

6. The header of claim 5, wherein the adjustable draper seal covers the bead seal.

7. The header of claim 1, wherein the adjustable draper seal is only attached to the draper frame.

8. The header of claim 1, wherein the adjustable draper seal is positioned between the conveyor and the cutter bar plate.

9. The header of claim 1, wherein the adjustable draper seal is adjacent an aft end of the cutter bar plate.

10. The header of claim 1, wherein the adjustable draper seal is posterior to the cutter bar plate.

11. The header of claim 1, wherein the adjustable draper seal extends along substantially an entire width of the fore end of the conveyor.

12. An agricultural harvester comprising the header of claim 1.

13. The header of claim 1, wherein the adjustable draper seal is movable between a first vertical position and a second vertical position spaced from the first vertical position.

14. The header of claim 1, wherein the adjustable draper seal is attached to the draper frame beneath the conveyor.

15. The header of claim 1, wherein the slot is an elongated substantially vertical slot.

16. A header for an agricultural harvester comprising:
    a cutter bar plate;
    a draper frame adjacent the cutter bar plate;
    a conveyor supported by the draper frame and having a fore end and an aft end; and
    a draper seal attached to the draper frame, the draper seal including:
       a first portion attached to the draper frame,
       a second portion extending forwardly from the first portion,
       a third portion extending upwardly from the second portion, and
       a fourth portion extending rearwardly from the third portion.

17. The header of claim 16, wherein the conveyor comprises a bead seal disposed along the fore end of the conveyor.

18. The header of claim 16, wherein the draper seal is positioned between the conveyor and the cutter bar plate.

19. A header for an agricultural harvester comprising:
    a cutter bar plate;
    a draper frame adjacent the cutter bar plate;
    a conveyor supported by the draper frame and having a fore end and an aft end; and
    a draper seal attached to the draper frame, the draper seal including:
       a first portion attached to the draper frame,
       a second portion extending perpendicular to the first portion,
       a third portion extending perpendicular to the second portion, and
       a fourth portion extending perpendicular to the third portion.

20. The header of claim 19, wherein the conveyor comprises a bead seal disposed along the fore end of the conveyor.

* * * * *